Nov. 23, 1943. E. NASSIMBENE 2,335,157
OVERFILL PREVENTER FOR BATTERIES
Filed Feb. 1, 1943

INVENTOR.
ERNEST NASSIMBENE
BY Martin E. Anderson
ATTORNEY

Patented Nov. 23, 1943

2,335,157

UNITED STATES PATENT OFFICE 2,335,157

OVERFILL PREVENTER FOR BATTERIES

Ernest Nassimbene, Denver, Colo., assignor to Gates Rubber Company, Denver, Colo., a corporation of Colorado Application February 1, 1943, Serial No. 474,397

3 Claims. (Cl. 136—178)

This invention relates to improvements in storage battery covers and has reference more particularly to an improved construction for preventing overfilling.

Storage batteries of all kinds are so constructed that the electrolyte should be kept as nearly as possible to a predetermined level and should not exceed this by any considerable amount nor fall below this level to any great extent.

Storage batteries of the type employed in connection with automobiles and other automotive vehicles have additional distilled water added to the electrolyte from time to time. It is difficult for the attendant to properly judge the level of the water in the battery with the result that they are frequently overfilled, which is objectionable.

To guard against overfilling of batteries of the type referred to, various constructions of covers have been made and patented which have for an object to limit the amount of liquid that can be introduced to a predetermined level.

It is the object of this invention to produce an improved overfill preventing cover that shall be so constructed that it will not add materially, if at all, to the expense of manufacture and which shall be reliable in its operation.

Another object is to produce a cover construction that shall not require expensive and complicated re-designing of the molds now in use.

A still further object is to produce a cover of the type indicated in which the cooperating parts can be placed in position in the cell without disassembling the battery.

And a still further object is to produce an overfill device that shall be proof against erosion and failure.

The above and other objects that may become apparent as the description proceeds are attained by means of the construction and an arrangement of parts that will now be described in detail, and for this purpose reference will be had to the accompanying drawing in which the invention has been illustrated, and in which.

Figure 1:
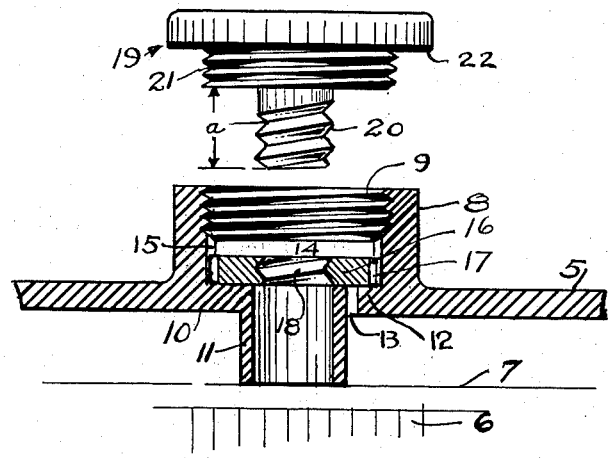
Figure 1 is a section taken on a diameter of a fill opening showing the parts in sealing position, the plug being shown in side elevation and positioned above the cover.

In the drawing numeral 5 indicates the cover of an ordinary automobile storage battery. Only a small section of the cover has been shown as the invention is limited to the construction surrounding the fill opening. The plates have been designated by reference numeral 6, and the normal level of the electrolyte by reference numeral 7. Surrounding the fill opening is an upwardly extending wall 8, whose inner surface is provided with threads 9 to which reference will hereinafter be made. Surrounding the inner surfaces of the wall at or about the level of the cover 5, is an inwardly extending flange 10 and projecting downwardly from this is a tubular portion 11. The distance this tubular portion extends downwardly varies in accordance with the desired electrolyte level that is to be maintained. It will be observed that the diameter of the opening in the tubular member is less than the diameter of the fill opening bounded by the wall 8, and a shoulder 12 is therefore provided at the bottom of the fill opening. Extending through the shoulder are one or more vent openings 13, one being shown in the drawing. That portion of the inner wall of the fill opening which has been designated by reference numeral 14 has a diameter slightly less than the inner diameter of the threaded portion and in the form shown in Figures 1 and 3 this cylindrical wall portion is provided with two vertical grooves 15. Resting on the shoulder 12 is a lead washer 16 which, in the embodiment shown in Figures 1 and 3, is provided with two positioning lugs 17 that enter the grooves 15 and prevent rotation. The washer 16 has an opening 18 provided with one or more turns of coarse lead threads, in the manner shown in Figures 1 and 2. The threads 9 have smaller lead than the threads 18 for a purpose which will presently appear. When the parts are in the position shown in Figure 1, liquid, such as distilled water, can be introduced through the fill opening and will pass downwardly through the opening 18, thence through the tube 11 into the cell. When the level of the electrolyte reaches the lower end of the tubular member, air can no longer escape through the fill opening and therefore the electrolyte level will be limited to substantially the bottom of the tube 11. The reason the air between the cover and the electrolyte cannot escape through the opening 13 is that washer 16 rests on the shoulder and seals the openings. The outer surface of the washer is naturally wetted by the water during the filling operation and an airtight seal is thus formed. After the electrolyte level has reached the lower end of the tube 11 any further attempt to introduce distilled water or electrolyte will merely cause the fill opening to fill with water, thereby indicating that the level has reached the desired height. After the proper amount of liquid has been introduced the plug, shown in side elevation in Figure 1 and designated by reference numeral 19, is introduced. It will be observed that this plug has two cylindrical threaded portions, the one designated by reference numeral 20 is provided with threads of the same lead as the threads 18 in washer 16, whereas, the threaded portion 21 has threads of the same lead as the threaded section 9. The length of the part having threads 20 has been designated by letter *a* and this should be slightly less than the distance from the top of wall 8 to the top of the washer 16. When the plug is turned so as to move downwardly, a differential action takes place and washer 16 is raised from the shoulder and reaches the position shown in Figure 2 when the plug is in place. A gasket 22 is provided around the upper end of the threaded portion 21 to form a seal. The plug is provided also with the usual vent opening.

Figure 3:
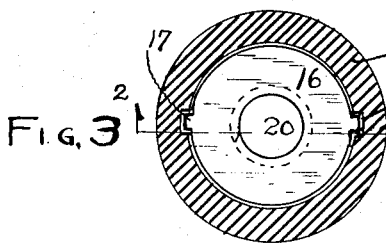
Figure 3 is a section taken on line 3—3, Figure 2, and shows one form of rotation preventing means.
Figure 4:
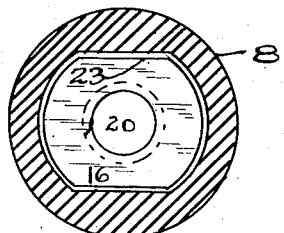
Figure 4 is a section which has also been taken on line 3—3, Figure 2, and shows another form of rotation preventing construction.

It is evident that the washer 16 must be held against rotation and one construction for effecting this has been shown in Figure 3. In Figure 4 another construction has been shown in which the washer 16 is provided with one or more flattened sides 23 and that portion of the inner surface of the wall 8, which has been indicated by reference numeral 14 in Figure 1, is provided with a correspondingly shaped positioning flat surface.

Although two specifically different means have been shown for preventing rotation of the washer 16 within the opening, it is evident that other mechanical equivalents may be substituted.

Figure 2:
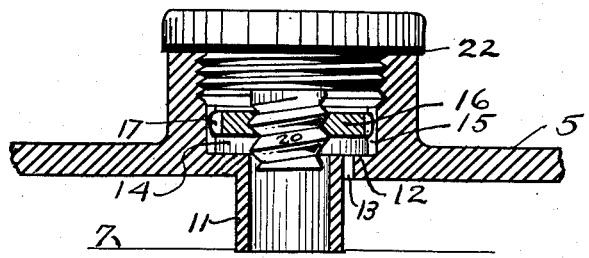
Figure 2 is a view similar to that shown in Figure 1 and shows the plug in place in the cell opening.

When the parts are in the position shown in Figure 2, any gas that is generated can escape through the opening 13 and through the opening in the plug, thereby preventing the formation of dangerous pressures. As soon as the plug is removed, the washer drops down onto the shoulder 12 effecting a seal that prevents the escape of air or gas and thus limits the amount of liquid that can be introduced.

It will be observed that the construction shown on the drawing and described is very simple and that it requires very little, if any, change from the present construction. The cylindrical wall surface 14, which has been shown in the drawing and referred to in the specification, where it has been pointed out that it is of less diameter than the clear diameter of the threaded portion 9, can be omitted and the grooves 15 replaced by similar depressions as it is possible to introduce the washer by a tilting movement instead of by a straight movement as shown.

The parts must, of course, be so proportioned and the difference in lead of the threads 9 and threads 18 so selected that the plug can be turned sufficiently to set the gaskets 22 against the upper surfaces of the walls before the washer 16 reaches the lower end of the threaded section 21. The drawing has been roughly proportioned to permit the operation described, but since the drawing is not scale, it should not be strictly construed.

Having described the invention what is claimed as new is:

1. A storage battery cover having a fill opening of two different diameters, the larger section being on top, an annular shoulder at the junction of the two sections, there being a vent opening in the material forming the shoulder, communicating the space above with the space surrounding the wall of the lower section, a sealing washer resting on the upper surface of the shoulder, means for holding the washer from rotating, a plug for sealing the opening, and means for lifting the washer from the shoulder when the plug is inserted and for dropping it onto the shoulder when the plug is removed comprising a threaded interconnection between the plug and the wall of the fill opening, and a threaded connection of greater lead than the former between the plug and the washer.

2. In a storage battery, a cover having a chambered wall provided with a vent opening, a plug fitted to said chambered wall, wall having a portion near the bottom of the chamber extending inwardly to form an annular supporting shoulder, the upper end of the vent opening terminating in the upper surface of the annular shoulder, a washer-like sealing member of lead normally resting on the shoulder and closing the vent opening, means for holding the washer from rotating, the wall of the opening in the washer being threaded, and means for raising the washer from the shoulder when the plug is inserted in the chamber and for depositing it onto the shoulder when the plug is removed, said means comprising interengaging threads on the inner wall of the chamber adjacent the upper end thereof and on the plug, the plug having a central downwardly extending threaded projection engaging the threads in the washer, the latter threads having a greater lead than the former.

3. A battery cover having a fill opening bounded by an upwardly extending cylindrical member and a downwardly extending tubular member, the greatest transverse dimension of the latter being less than the diameter of the opening in the upwardly extending member, the surface connecting the two forming an annular shoulder, there being at least one vent opening in the shoulder communicating the upper surface thereof with the under surface of the cover at a point outside of the downwardly extending member, a washerlike sealing member normally resting on the upper surface of the shoulder in position to seal the vent, the inner surface of the cylindrical member having a threaded section at its upper end, the sealing member having the wall of its center opening provided with threads of a greater lead than the threads in the cylindrical member, and a plug for closing the fill opening, said plug having a threaded portion for engaging the first mentioned threads, and a central downward projection having threads engaging the threads in the sealing member, whereby the latter will be raised from its seat when the plug is turned in one direction due to the differential action of the threads.

ERNEST NASSIMBENE.